(12) United States Patent
Chou et al.

(10) Patent No.: US 11,873,811 B2
(45) Date of Patent: Jan. 16, 2024

(54) FIXING DEVICE OF MOTOR OF AIR COMPRESSOR

(71) Applicants: Wen-San Chou, Tainan (TW); Cheng-Hsien Chou, Tainan (TW)

(72) Inventors: Wen-San Chou, Tainan (TW); Cheng-Hsien Chou, Tainan (TW)

(*) Notice: Subject to any disclaimer, the term of this patent is extended or adjusted under 35 U.S.C. 154(b) by 0 days.

(21) Appl. No.: 17/746,703

(22) Filed: May 17, 2022

(65) Prior Publication Data
US 2022/0372971 A1    Nov. 24, 2022

(30) Foreign Application Priority Data
May 24, 2021 (TW) ................. 110118731

(51) Int. Cl.
*F04B 53/22* (2006.01)
*F04B 35/04* (2006.01)

(52) U.S. Cl.
CPC .............. *F04B 53/22* (2013.01); *F04B 35/04* (2013.01)

(58) Field of Classification Search
CPC ........ F04B 35/04; F04B 39/121; F04B 39/14; F04B 53/22; H02K 5/00; H02K 5/04; H02K 5/207; H02K 5/22
See application file for complete search history.

(56) References Cited

U.S. PATENT DOCUMENTS

| 6,280,163 B1 * | 8/2001 | Chou .................. F04B 39/0016 |
| | | 74/421 A |
| 6,655,928 B2 * | 12/2003 | Chou .................... F04B 39/125 |
| | | 417/415 |
| 8,629,583 B2 * | 1/2014 | Bernhardt ................ H02K 7/14 |
| | | 310/91 |

(Continued)

FOREIGN PATENT DOCUMENTS

| CN | 104343658 A | * | 2/2015 |
| CN | 105443351 A | * | 3/2016 |

(Continued)

OTHER PUBLICATIONS

"Search Report of Europe Counterpart Application", dated Sep. 12, 2022, p. 1-p. 8.

(Continued)

*Primary Examiner* — Alexander B Comley
(74) *Attorney, Agent, or Firm* — JCIPRNET

(57) ABSTRACT

An air compressor is received in an accommodation box and contains a body, a cylinder, a motor, and a transmission mechanism. The body includes a first positioning orifice and a second positioning orifice. The cylinder is connected on the body and communicates with an air storage holder. The motor is fixed on the body, a small gear is received in the first positioning orifice, and a connection seat is accommodated in the first orifice. The transmission mechanism actuates a piston to move in the cylinder reciprocately so as to produce compressed air. The motor includes at least one locking (Continued)

extension for engaging the motor with the body. A first end of a respective one locking extension extends from the motor, and a second end of the respective one locking extension is engaged on the body, hence the motor is fixed on the body securely without using any screws.

6 Claims, 11 Drawing Sheets

(56) References Cited

U.S. PATENT DOCUMENTS

| | | | | |
|---|---|---|---|---|
| 2004/0105766 A1* | 6/2004 | Chou | ............... | F04B 39/125 417/415 |
| 2005/0063840 A1* | 3/2005 | Chou | ............... | F04B 35/04 417/415 |
| 2007/0264139 A1* | 11/2007 | Chou | ............... | F04B 35/04 417/415 |
| 2008/0237510 A1* | 10/2008 | Chou | ............... | F04B 35/01 251/15 |
| 2013/0078119 A1* | 3/2013 | Chou | ............... | F04B 35/01 417/374 |
| 2014/0283680 A1* | 9/2014 | Chou | ............... | F04B 53/143 92/169.1 |
| 2015/0071798 A1* | 3/2015 | Chou | ............... | F04B 39/12 417/415 |
| 2015/0330379 A1* | 11/2015 | Chou | ............... | F04B 39/0094 417/374 |
| 2018/0223824 A1* | 8/2018 | Inoue | ............... | F04B 39/14 |
| 2020/0102953 A1* | 4/2020 | Chou | ............... | F04B 53/22 |
| 2020/0208620 A1* | 7/2020 | Chou | ............... | F04B 39/14 |
| 2021/0003132 A1 | 1/2021 | Imai et al. | | |

FOREIGN PATENT DOCUMENTS

| | | | | |
|---|---|---|---|---|
| CN | 105756904 A | * | 7/2016 | |
| CN | 206283384 | | 6/2017 | |
| CN | 206283384 U | * | 6/2017 | |
| CN | 108915989 A | * | 11/2018 | ............. F04B 35/04 |
| DE | 19539017 A1 | * | 4/1997 | ............. F04B 17/03 |
| DE | 202014102910 U1 | * | 8/2014 | ............. F04B 35/04 |
| DE | 202017100185 U1 | * | 3/2017 | ............. A24F 15/18 |
| DE | 102019218768 | | 6/2021 | |
| EP | 3670911 | | 6/2020 | |
| EP | 3670911 A1 | * | 6/2020 | ............. F04B 35/04 |
| JP | S58124056 | | 8/1983 | |
| JP | S6093472 | | 6/1985 | |
| JP | H10117460 | | 5/1998 | |
| JP | 3198982 U | * | 7/2015 | ............. B60L 15/08 |
| JP | 3199686 U | * | 9/2015 | ............. F04B 35/01 |
| JP | 3204950 U | * | 6/2016 | ............. F04B 35/04 |
| JP | 2016134997 | | 7/2016 | |
| JP | 3205941 U | * | 8/2016 | ............. F04B 35/04 |
| JP | 2018123809 | | 8/2018 | |
| JP | 2020094585 | | 6/2020 | |
| JP | 2020097936 | | 6/2020 | |
| KR | 20180061540 | | 6/2018 | |

OTHER PUBLICATIONS

"Office Action of Japan Counterpart Application", dated May 16, 2023, p. 1-p. 3.

"Notice of allowance of Japan Counterpart Application", dated Sep. 5, 2023, p. 1-p. 4.

* cited by examiner

FIXING DEVICE OF MOTOR OF AIR COMPRESSOR

FIELD OF THE INVENTION

The present invention relates to a fixing device of a motor of an air compressor.

BACKGROUND OF THE INVENTION

A conventional air compressor contains a body, a cylinder connected on the body, a motor fixed on the body, and a piston driven by the motor to move in the cylinder reciprocately, such that the motor actuates the piston to move in the cylinder reciprocately, thus sucking, compressing, and discharging airs. Furthermore, the air compressor is received in an accommodation box.

The motor is fixed on the body by screws, but it is easy to remove from the body after a period of using time. When the screws are inserted through the body to screw with multiple threaded orifices of a casing of the motor, a tool is difficult to screw the screws with the multiple threaded orifices in a limited space. Therefore, the motor cannot be fixed on the body by using the screws easily.

The present invention has arisen to mitigate and/or obviate the afore-described disadvantages.

SUMMARY OF THE INVENTION

The primary aspect of the present invention is to provide a fixing device of a motor of an air compressor which is received in an accommodation box, the motor includes multiple coupling orifices defined thereon and configured to engage on the multiple posts of the body, and the motor further includes at least one locking extension configured to engage with the body, thus connecting the motor on the body securely without using any screws.

Further aspect of the present invention is to provide a fixing device of a motor of an air compressor by which the motor is removed from the body by using a removal tool, and the removal tool is configured to press the at least one locking extension away from the body, thus removing the motor from the body easily and quickly.

Another aspect of the present invention is to provide a fixing device of a motor of an air compressor by which the air compressor is received in the accommodation box, two abutting portions are formed on an inner wall of a first casing and an inner wall of a second casing of the accommodation box, and the two abutting portions are two protrusions of the accommodation box configured to define two flexible wings of the two locking extensions between the motor and the body, hence the air compressor is received in the accommodation box stably by using the two flexible wings of the two locking extensions.

DETAILED DESCRIPTION OF THE PREFERRED EMBODIMENTS

Figure 1:
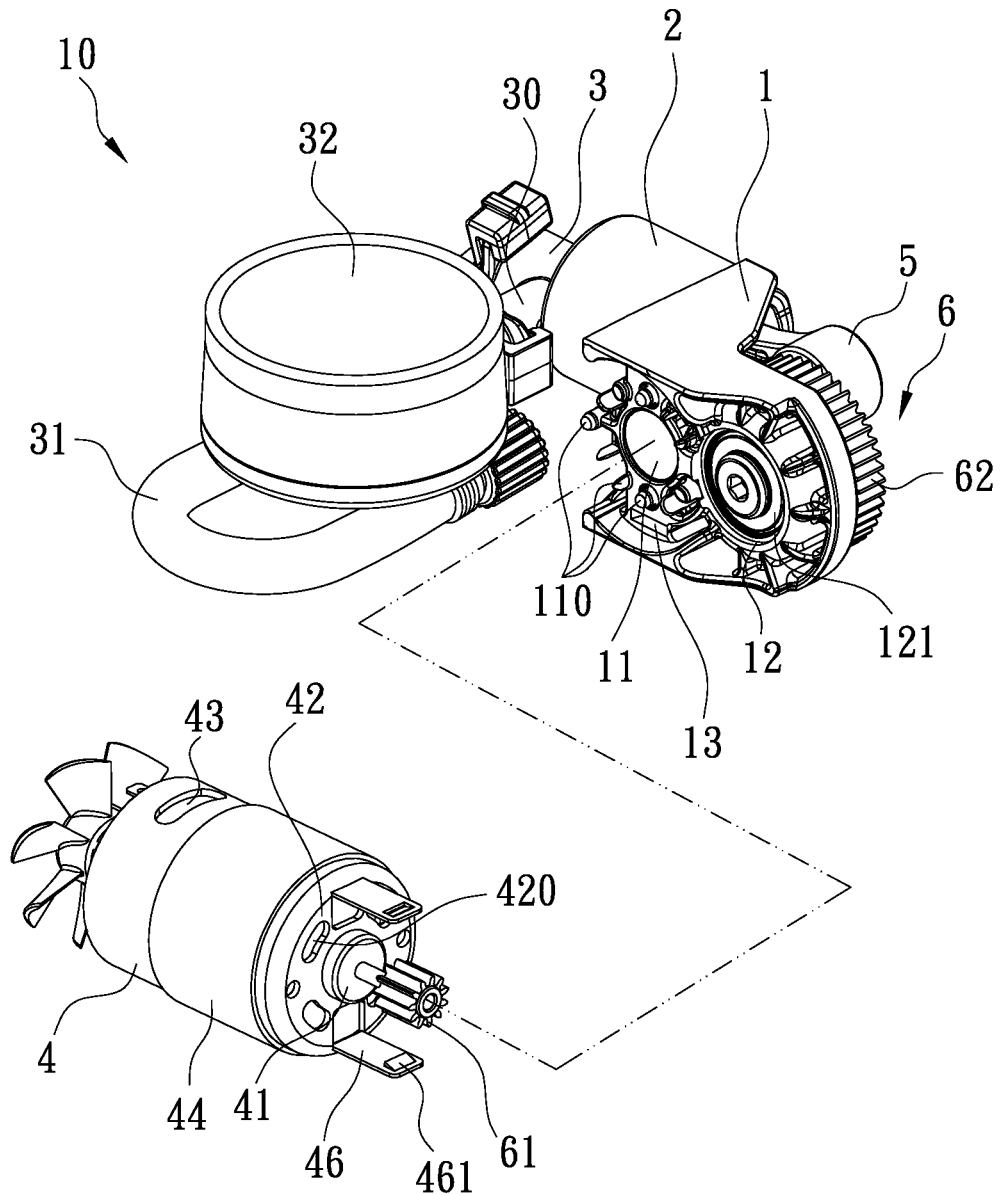
FIG. 1 is a partially perspective view showing the exploded components of a fixing device of a motor of an air compressor according to a first embodiment of the present invention.
Figure 2:
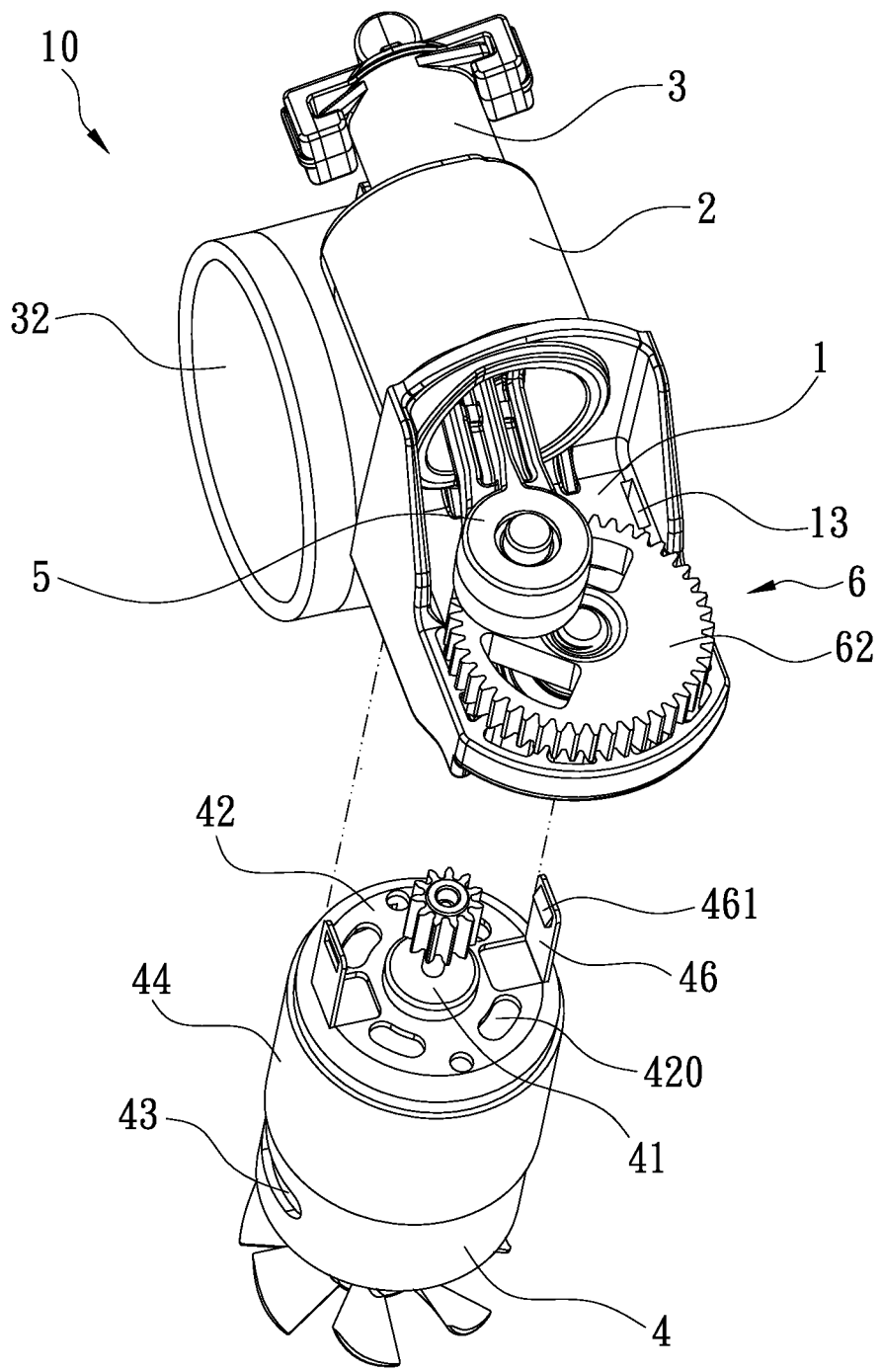
FIG. 2 is another partially perspective view showing the exploded components of the fixing device of the motor of the air compressor according to the first embodiment of the present invention.
Figure 3:
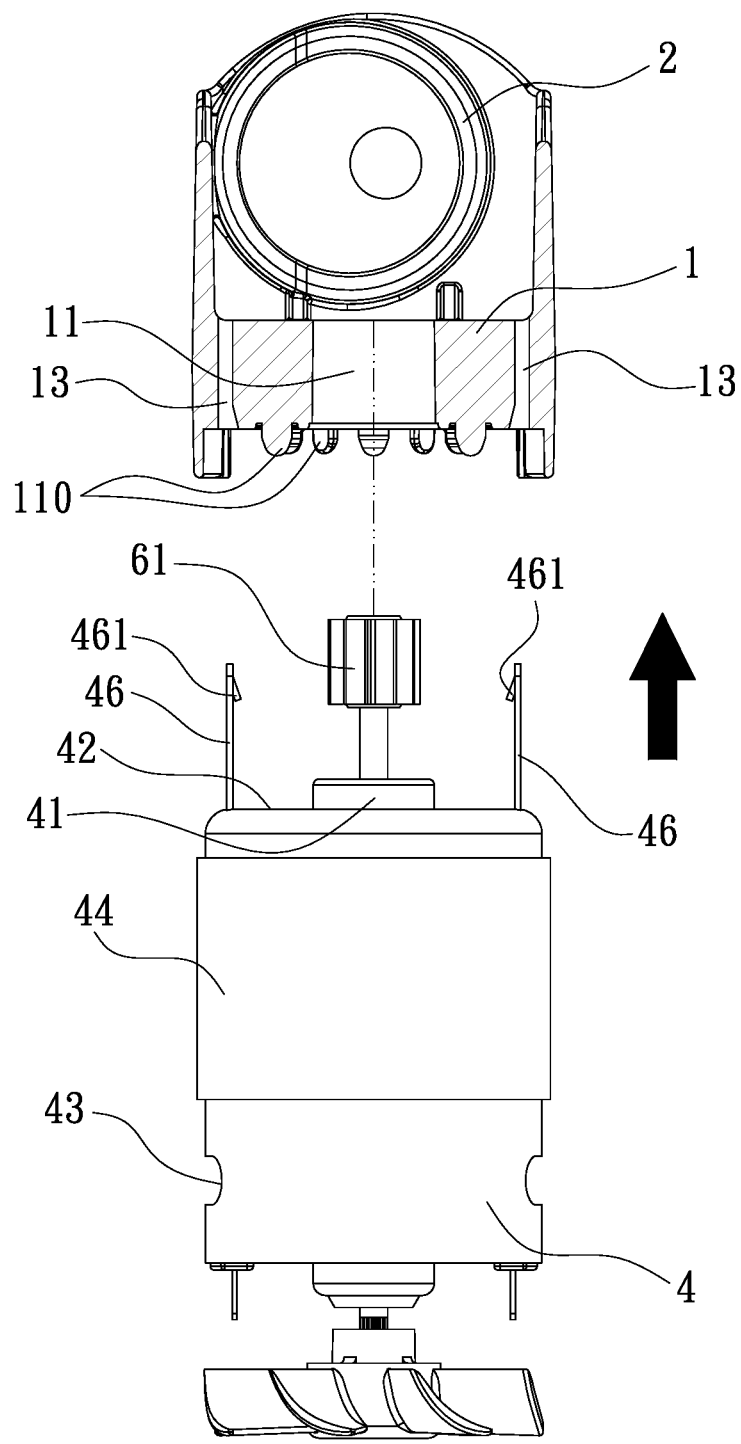
FIG. 3 is a partially side plan view showing the exploded components of the fixing device of the motor of the air compressor according to the first embodiment of the present invention.
Figure 4:
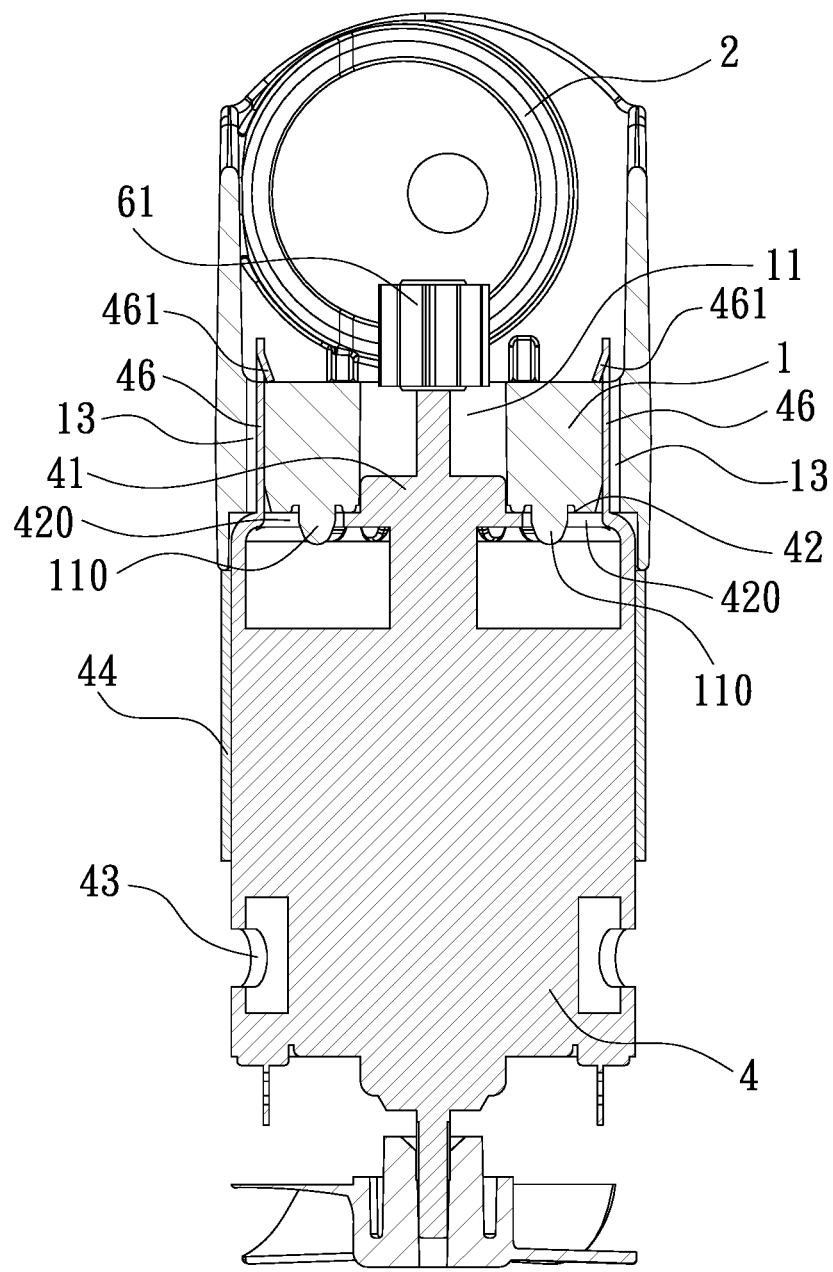
FIG. 4 is a partially cross sectional view showing the exploded components of the fixing device of the motor of the air compressor according to the first embodiment of the present invention.
Figure 10:
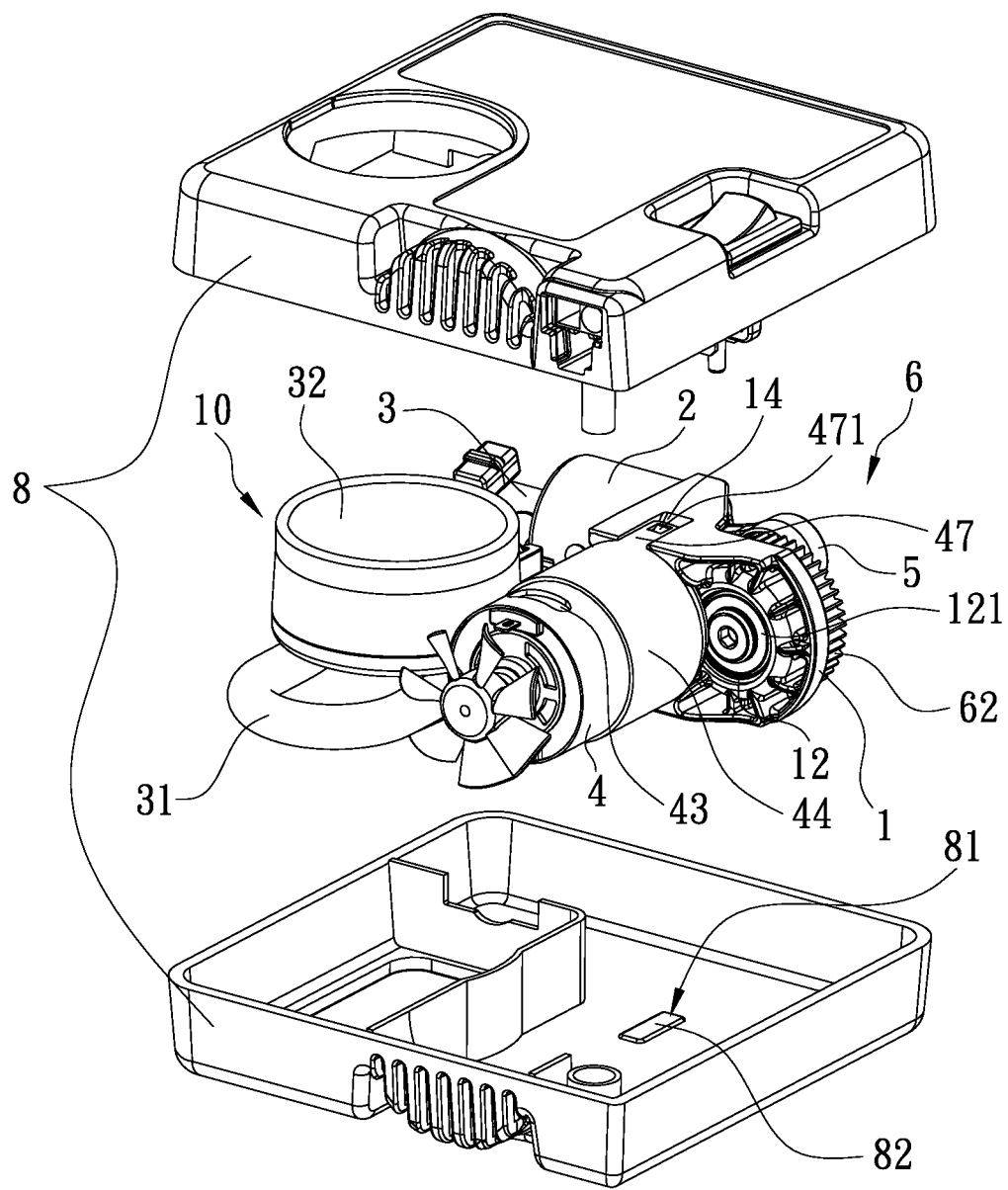
FIG. 10 is a perspective view showing the operation of the air compressor according to the second embodiment of the present invention.

With reference to FIG. 10, an air compressor 10 according to a first embodiment of the present invention is received in an accommodation box 8. Referring to FIGS. 1 and 2, the air compressor 10 comprises a body 1, a cylinder 2 connected on the body 1, a motor 4 fixed on the body 1, and a piston 5 driven by the motor 4 to move in the cylinder 2 reciprocately.

The body 1 includes multiple positioning orifices which are a first positioning orifice 11 and a second positioning orifice 12, wherein a small gear 61 is received in the first positioning orifice 11 and is connected on an end of the motor 4, and a connection seat 41 of the motor 4 is accommodated in the first orifice 11. The second positioning orifice 12 is configured to receive a bearing 121. The motor 4 further includes two dissipation holes 43 symmetrically formed on an outer wall of the casing thereof and configured to circulate airs and to dissipate heat from the motor 4. The motor 4 includes a magnetic coil 44 fitted thereon and made of metal material so as to guide magnetism efficiently, when the motor 4 operates.

The cylinder 2 is one-piece connected on the body 1 and is in communication with an air storage holder 3, wherein the air storage holder 3 includes at least one tube 30 in which an air hose 31 and a pressure gauge 32 are received.

A transmission mechanism 6 includes a large gear 62 having a counterweight block and configured to mesh with the small gear 61, wherein the large gear 62 is connected with a bearing 121 by using a shaft (not shown), and the transmission mechanism 6 actuates the piston 5 to move in the cylinder 2 reciprocately so as to produce compressed airs.

Figure 6:
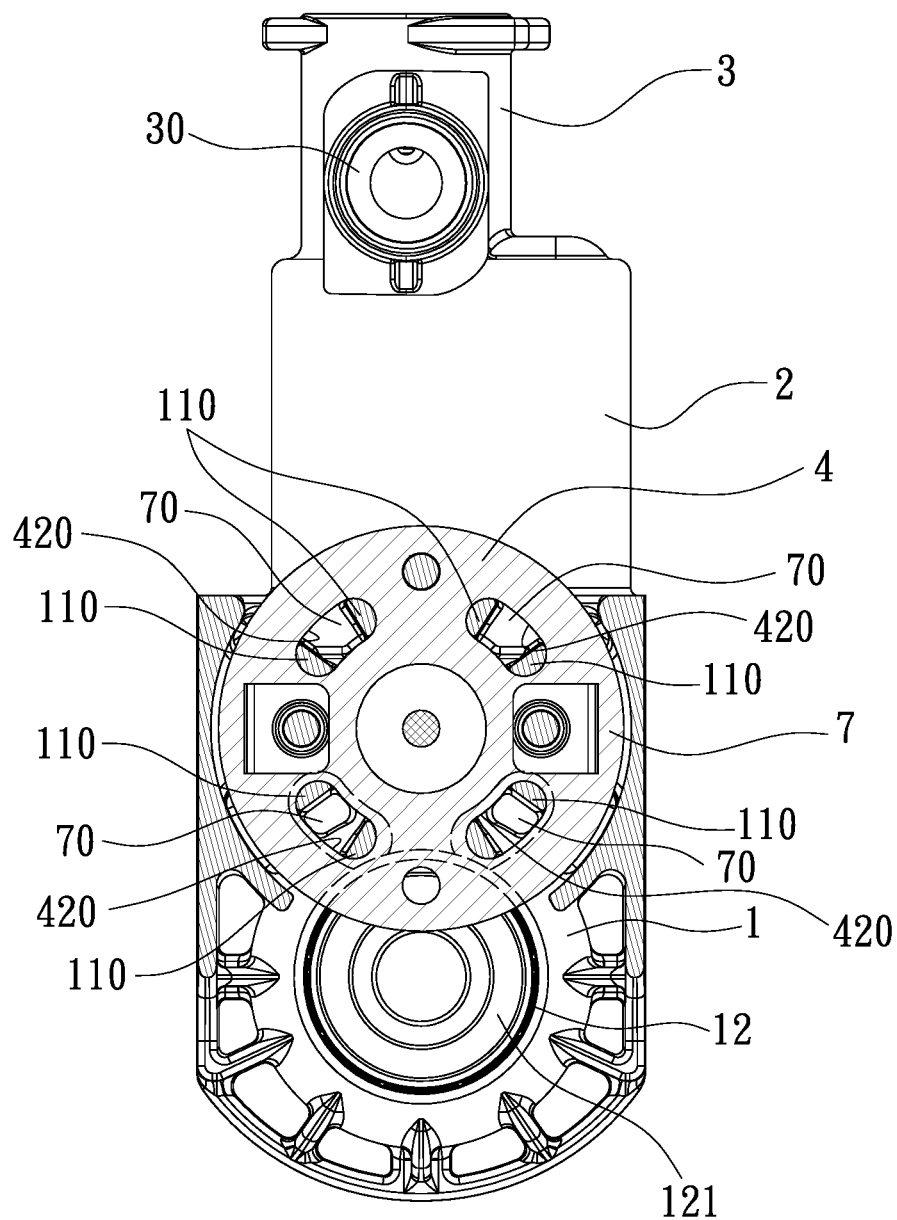
FIG. 6 is a cross sectional view showing the operation of the fixing device of the motor of the air compressor according to the first embodiment of the present invention.

As shown in FIGS. 1-4, the motor 4 includes multiple coupling orifices 420 defined on an head edge 42 thereof adjacent to small gear 61 and surrounding the connection seat 41, and the body 1 includes multiple posts 110 extending from a first outer wall thereof, surrounding the first positioning orifice 11, and corresponding to the multiple coupling orifices 420, such that when fixing the motor 4 to the body 1, the multiple coupling orifices 420 of the head edge 42 of the motor 4 are engaged on the multiple posts 110 of the body 1 so as to enhance rotating force of the motor 4 and to fix the motor 4 on the body 1 securely. Furthermore, a coupling face 7 has multiple through orifices 70 formed thereon, when the multiple posts 110 of the body 1 are engaged with the multiple coupling orifices 420 of the head edge 42 of the motor 4, as shown in FIG. 6, the connection seat 41 of the head edge 42 of the motor 1 is accommodated in the first positioning orifice 11, wherein the body 1 is engaged with the motor 4 by using two locking extensions 46, for example, a first end of a respective one locking extension 46 extends from the motor 4, and a second end of the respective one locking extension 46 is engaged on the body 1, hence the motor 4 is fixed on the body 1 securely without using any screws.

With reference to FIGS. 1-4, the two locking extensions 46 symmetrically extend from the head edge 42 of the motor 4, wherein the respective one locking extension 46 has a flexible wing 461 formed in a stamping manner, obliquely extending inward from an inner side of the respective one locking extension 46, and located away from the head edge 42. The body 1 further includes two recesses 13 passing therethrough vertically, such that two flexible wings 461 of the two locking extensions 46 are engaged on the body 1 quickly after being inserted through and forced by the two recesses 13 to deform, thus fixing the motor 4 on the body 1 without using any screws.

Figure 5:
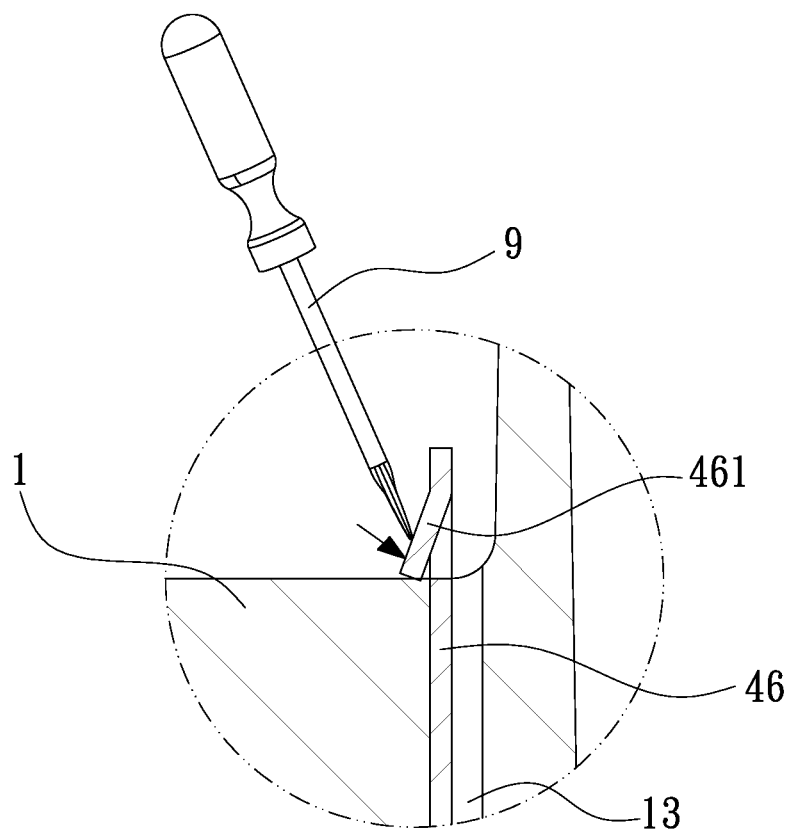
FIG. 5 is a partially cross-sectional view showing the operation of the fixing device of the motor of the air compressor according to the first embodiment of the present invention.

Referring further to FIG. 5, when the motor 4 is removed from the body 1 by ways of a removal tool 9, the flexible wing 461 of the respective one locking extension 46 is pressed by the removal tool 9 to detach from the body 1, and the motor 4 is removed from the body 1 easily and quickly, wherein the removal tool 9 is a screwdriver.

Figure 7:
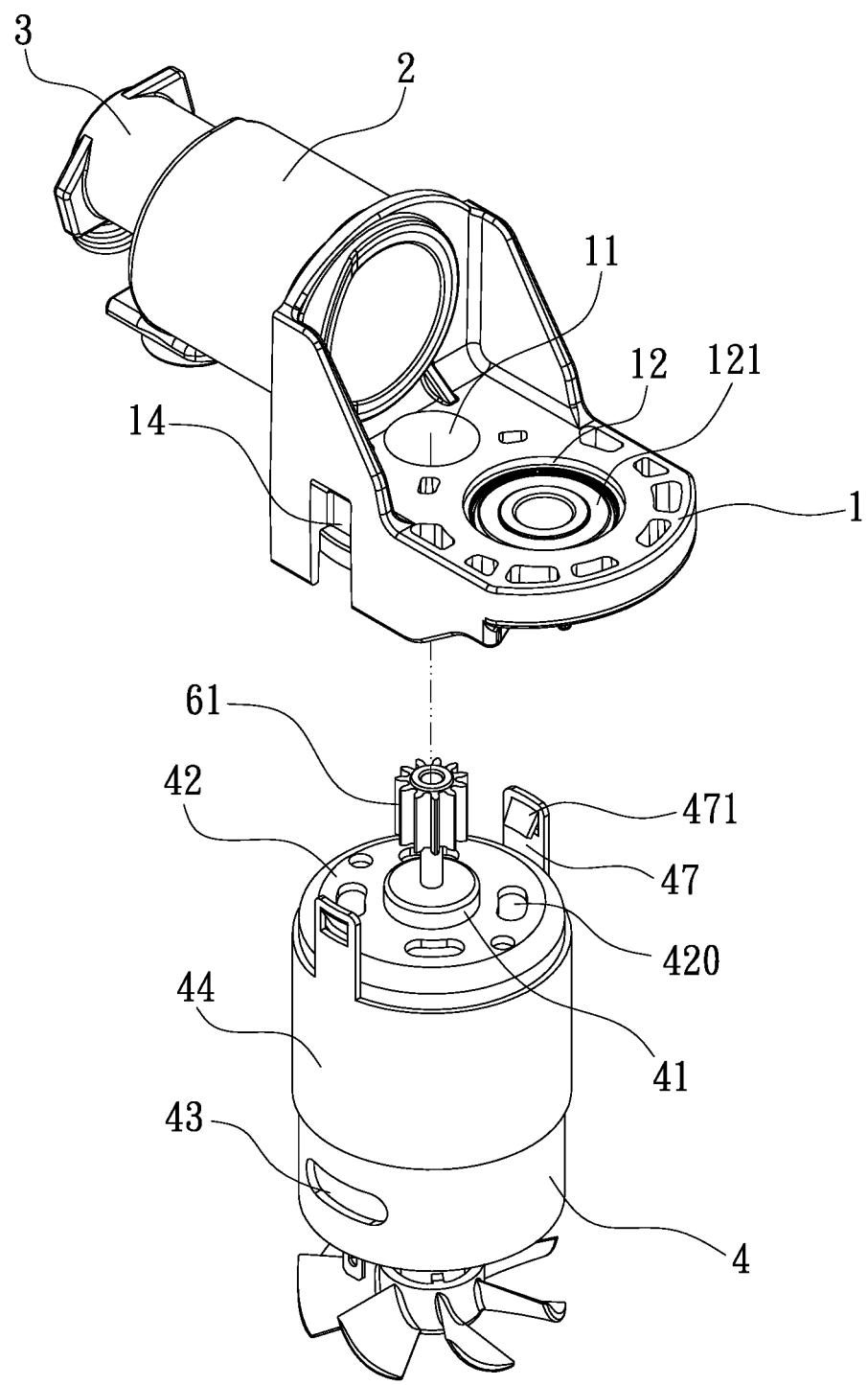
FIG. 7 is a partially perspective view showing the exploded components of a fixing device of a motor of an air compressor according to a second embodiment of the present invention.
Figure 8:
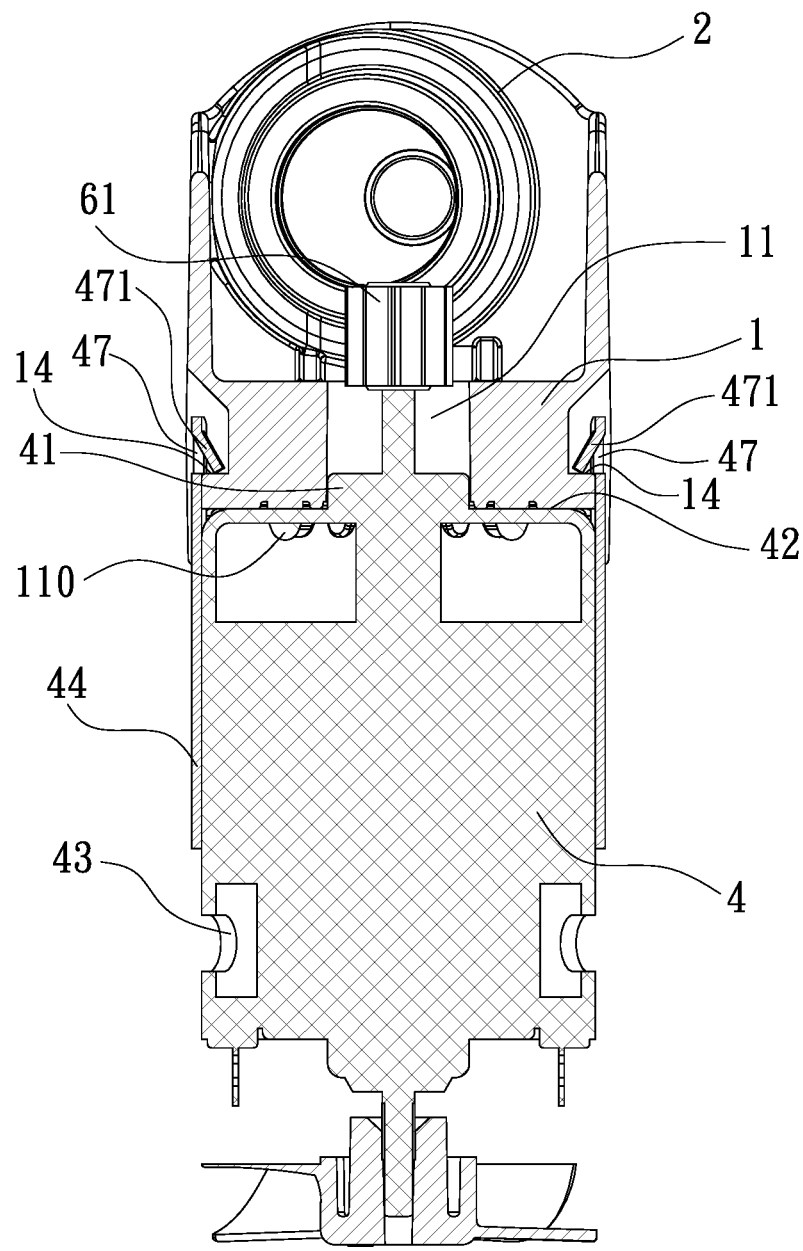
FIG. 8 is a partially perspective view showing the exploded components of the fixing device of the motor of the air compressor according to the second embodiment of the present invention.

As illustrated in FIGS. 7 and 8, in another preferred embodiment, a difference of a second embodiment from that of the first embodiment comprises: the motor 4 including two locking extensions 47 symmetrically extending from the magnetic coil 44 which is fitted on the motor 4, wherein a respective one locking extension 47 has a flexible wing 471 bent inward from an inner side thereof and located away from the head edge 42, and the body 1 includes two notches 14 symmetrically defined on two sides thereof, such that the flexible wing 471 of the respective one locking extension 47 is engaged with a respective one notch 14 of the body 1, hence the motor 4 is fixed on the body 1 securely without using any screws.

Figure 9:
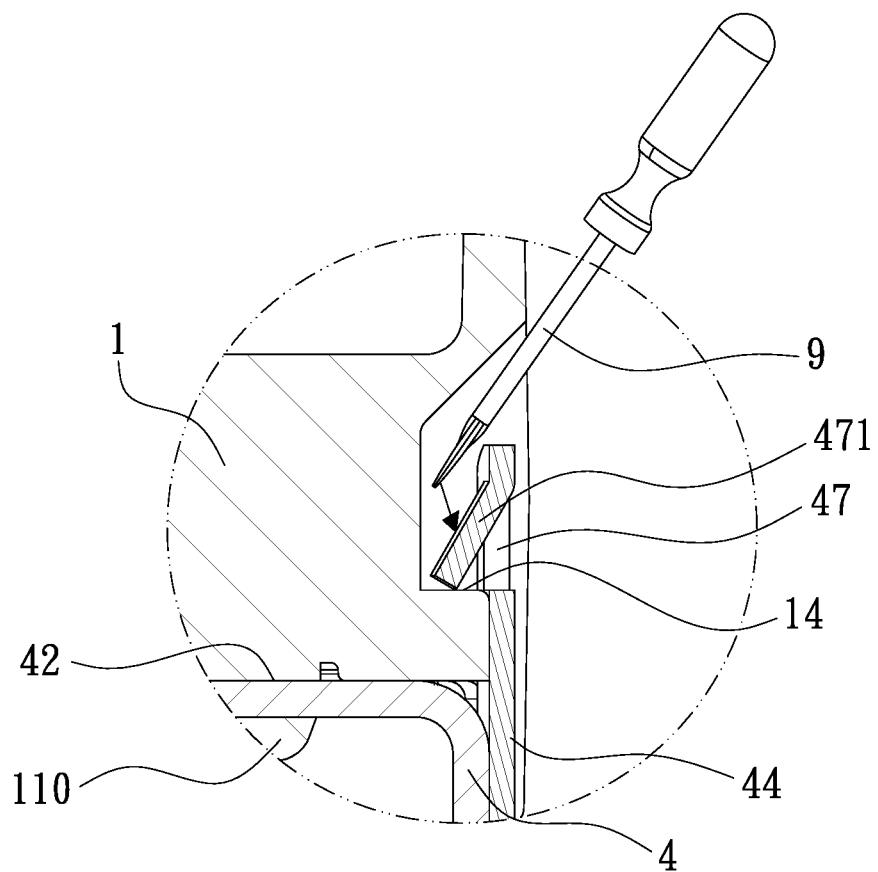
FIG. 9 is an amplified cross-sectional view of a part of FIG. 8.

As shown in FIG. 9, the motor 4 is removed from the body 1 by ways of a removal tool 9, wherein the removal tool 9 is inserted into the respective one notch 14 of the body 1 to press the flexible wing 471 of the respective one locking extension 47 away from the respective one notch 14 of the body 1, and the motor 4 is removed from the body 1 easily and quickly.

Figure 11:
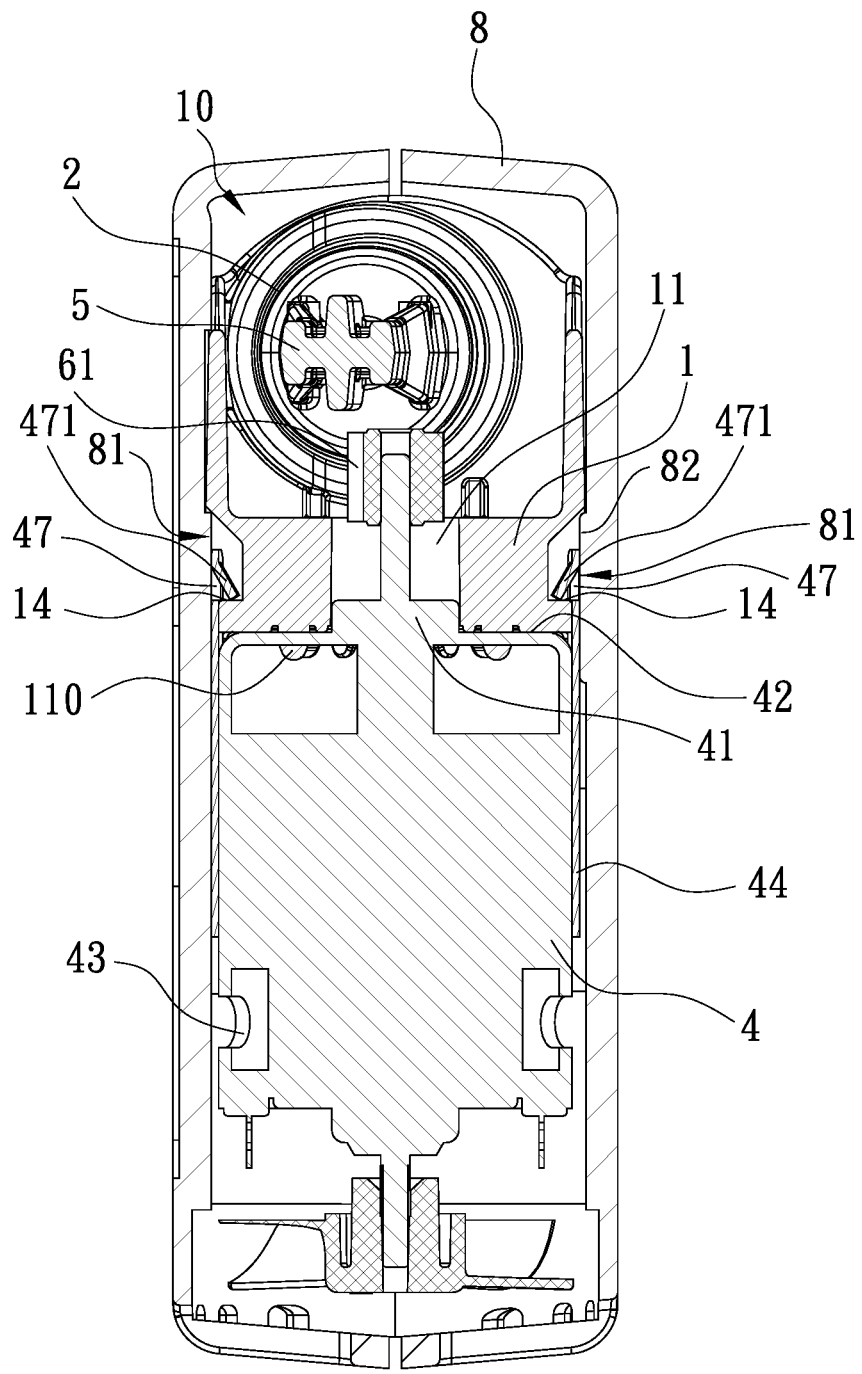
FIG. 11 is a cross sectional view showing the operation of the air compressor according to the second embodiment of the present invention.

With reference to FIGS. 10 and 11, the air compressor 10 is received in the accommodation box 8, wherein two abutting portions 81 are formed on an inner wall of a first casing and an inner wall of a second casing of the accommodation box 8, and the two abutting portions 81 are two protrusions 82 of the accommodation box 8 configured to define two flexible wings 471 of the two locking extensions 47 between the motor 4 and the body 1, hence the air compressor 10 is received in the accommodation box 8 stably by using the two flexible wings 471 of the two locking extensions 47.

Thereby, the fixing device of the motor 4 of the air compressor 10 comprises the multiple coupling orifices 420 configured to engage on the multiple posts 110 of the body 1 so as to fix the motor 4 on the body 1 and to enhance the rotating force of the motor 4.

Preferably, the motor 4 includes at least one locking extension 46 configured to engage with the body 1, thus fixing the motor 4 on the body 1 securely without using any screws.

The air compressor 10 is received in the accommodation box 8, wherein the two abutting portions 81 are formed on the inner wall of the first casing and the inner wall of the second casing of the accommodation box 8, such that the two flexible wings 471 of the two locking extensions 47 are defined between the motor 4 and the body 1, and the air compressor 10 is received in the accommodation box 8 stably by using the two flexible wings 471 of the two locking extensions 47.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A fixing device of a motor of an air compressor, the air compressor being received in an accommodation box, the air compressor comprising a body, and the body including multiple positioning orifices comprising a first positioning orifice and a second positioning orifice;
   a cylinder connected on the body and which communicates with an air storage holder;
   a motor fixed on the body, wherein a small gear is received in the first positioning orifice, and a connection seat of the motor is accommodated in the first positioning orifice;
   a transmission mechanism actuating a piston to move in the cylinder reciprocately so as to produce compressed air;
   wherein the motor includes two locking extensions configured to engage the motor with the body, wherein end of a first each locking extension extends from the motor, and a second end of each locking extension is engaged on the body such that the motor is fixed on the body securely without using any screws,
   wherein the motor includes a magnetic coil fitted thereon and made of metal material so as to guide magnetism when the motor operates,
   wherein the two locking extensions symmetrically extend from the magnetic coil, each locking extension has a flexible wing bent inward from an inner side thereof and located away from a head edge of the motor, and the body includes two notches symmetrically defined on two sides thereof,
   wherein two abutting portions are formed on an inner wall of a first casing and an inner wall of a second casing of the accommodation box, and the two abutting portions of the accommodation box are configured to press against and hold the two flexible wings of the two locking extensions in engagement with the two corresponding notches.

2. The fixing device as claimed in claim 1, wherein the motor further includes two dissipation holes symmetrically formed on an outer wall of a motor casing and configured to circulate air and to dissipate heat from the motor.

3. The fixing device as claimed in claim 1, wherein the motor includes multiple coupling orifices defined on the head edge thereof adjacent to the small gear and surrounding the connection seat, and the body includes multiple posts extending from a first outer wall thereof and surrounding the first positioning orifice, the multiple posts corresponding to the multiple coupling orifices such that when fixing the motor to the body, the multiple coupling orifices of the head edge of the motor are engaged on the multiple posts of the body so as to fix the motor on the body securely when the motor operates.

4. The fixing device as claimed in claim 3, wherein the head edge has multiple through orifices, wherein when the multiple posts of the body are engaged with the multiple coupling orifices of the head edge of the motor, the connection seat of the head edge of the motor is accommodated in the first positioning orifice.

5. The fixing device as claimed in claim 1, wherein when the motor is removed from the body by means of a removal tool, the flexible wing of the corresponding locking extension is pressed by the removal tool to detach from the body, and the motor is removed from the body.

6. The fixing device as claimed in claim 1, wherein the air compressor is received in the accommodation box stably through the two flexible wings of the two locking extensions.

* * * * *